(12) United States Patent
Crognale et al.

(10) Patent No.: US 11,381,306 B2
(45) Date of Patent: Jul. 5, 2022

(54) BISECTION SEARCHING ALGORITHM TO DERIVE OPTIMUM BAUD RATE WITH MAXIMUM SPECTRAL EFFICIENCY EXPLOITING Q-MARGIN-TO-SNR-MARGIN CONVERSION

(71) Applicant: Cisco Technology, Inc., San Jose, CA (US)

(72) Inventors: Claudio Crognale, Monza (IT); Giovanni Marenco, Novara (IT); Davide Sirtori, Carate Brianza (IT); Silvia Turolla, Vedano al Lambro (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/005,873

(22) Filed: Aug. 28, 2020

(65) Prior Publication Data

US 2021/0344418 A1    Nov. 4, 2021

Related U.S. Application Data

(60) Provisional application No. 63/017,103, filed on Apr. 29, 2020.

(51) Int. Cl.
*H04B 10/07* (2013.01)
*H04J 14/02* (2006.01)
(Continued)

(52) U.S. Cl.
CPC ............ *H04B 10/07953* (2013.01); *H04B 10/2507* (2013.01); *H04J 14/0224* (2013.01); *H04J 14/0227* (2013.01)

(58) Field of Classification Search
None
See application file for complete search history.

(56) References Cited

U.S. PATENT DOCUMENTS 7,986,878 B2    7/2011  Saunders et al.
8,467,676 B2    6/2013  Villarruel et al.
(Continued)

OTHER PUBLICATIONS

Macho, Andrés, "Wavelets in High Capacity DWDM Systems and Modal Division Multiplexed Transmissions", Advanced Optical Communications II, Technology and Communications Systems Master (EISIT-UPM), Final Work 2014, http://oa.upm.es/32590/, Jun. 1, 2014, 13 pages.
(Continued)

*Primary Examiner* — Li Liu
(74) *Attorney, Agent, or Firm* — Edell, Shapiro & Finnan, LLC

(57) ABSTRACT

Methods for configuring an optical link with an optimized spectral efficiency are provided. In these methods, a controller of an optical network obtains a baseline configuration that includes a traffic mode that uses a predetermined channel spacing of a plurality of channels in a frequency spectrum. The plurality of channels is used for transmitting optical signals on an optical link in the optical network. The controller further converts the SNR-margin to a Q-margin threshold value associated with a Q-margin as a performance parameter and while maintaining the performance parameter with a predetermined range of the Q-margin threshold value, varies at least one transmission parameter to reduce channel spacing. The controller also generates a spectral frequency map in which the channel spacing is reduced with respect to the baseline configuration and configures, via an optical network element in the optical network, the optical link based on the spectral frequency map.

20 Claims, 10 Drawing Sheets

(51) Int. Cl.
*H04B 10/079* (2013.01)
*H04B 10/2507* (2013.01)

(56) References Cited

U.S. PATENT DOCUMENTS

| | | | | |
|---|---|---|---|---|
| 8,873,962 | B2* | 10/2014 | Patel | H04J 14/0257 |
| | | | | 398/79 |
| 10,148,384 | B2 | 12/2018 | Swinkels et al. | |
| 10,587,339 | B1* | 3/2020 | Al Sayeed | H04B 10/07953 |
| 10,727,973 | B1* | 7/2020 | Kumar | H04J 14/0271 |
| 2003/0011846 | A1* | 1/2003 | Gholamhosseini | H04L 41/145 |
| | | | | 398/98 |
| 2005/0039103 | A1* | 2/2005 | Azenko | H04L 1/0072 |
| | | | | 714/776 |
| 2007/0009265 | A1* | 1/2007 | Bergano | H04B 10/671 |
| | | | | 398/155 |
| 2008/0095188 | A1* | 4/2008 | Remy | H04L 47/25 |
| | | | | 370/468 |
| 2011/0211623 | A1* | 9/2011 | Kanellakopoulos | |
| | | | | H04M 11/062 |
| | | | | 375/222 |
| 2014/0233957 | A1* | 8/2014 | Watanabe | H04B 3/32 |
| | | | | 398/91 |
| 2015/0016822 | A1* | 1/2015 | Ishikawa | H04J 14/0224 |
| | | | | 398/79 |
| 2015/0037034 | A1* | 2/2015 | Renaudier | H04B 10/508 |
| | | | | 398/65 |
| 2015/0304036 | A1* | 10/2015 | Huang | H04B 10/2543 |
| | | | | 398/79 |
| 2016/0050470 | A1* | 2/2016 | Swinkels | H04L 41/04 |
| | | | | 398/45 |
| 2016/0316281 | A1* | 10/2016 | Keyworth | H04J 14/0217 |
| 2017/0019178 | A1* | 1/2017 | Alic | H04B 10/2543 |
| 2017/0048018 | A1* | 2/2017 | Swinkels | H04B 10/58 |
| 2019/0190617 | A1* | 6/2019 | Aouini | H03L 7/099 |
| 2019/0253361 | A1* | 8/2019 | MacKay | H04L 41/147 |
| 2020/0076501 | A1* | 3/2020 | Searcy | H04B 10/0731 |
| 2020/0106543 | A1* | 4/2020 | Jiang | H04B 10/572 |
| 2020/0350994 | A1* | 11/2020 | Yue | H04L 25/03834 |

OTHER PUBLICATIONS

Yin, Yawei et al., "Software Defined Elastic Optical Networks for Cloud Computing", https://ieeexplore.ieee.org/document/7736620, Nov. 7, 2016, 5 pages.

Acacia Communications, "Network Optimization in the 600G Era", Dec. 18, 2018, Network-Optimization-in-the-600G-Era-WP1218.pdf, 9 pages.

* cited by examiner

BISECTION SEARCHING ALGORITHM TO DERIVE OPTIMUM BAUD RATE WITH MAXIMUM SPECTRAL EFFICIENCY EXPLOITING Q-MARGIN-TO-SNR-MARGIN CONVERSION

CROSS REFERENCE TO RELATED APPLICATION

This application claims priority to U.S. Provisional Application No. 63/017,103, filed Apr. 29, 2020, the entirety of which is incorporated herein by reference.

TECHNICAL FIELD

The present disclosure relates to optical networks.

BACKGROUND

Optical networks are commonly employed to transmit data across long distances. Wavelength-division multiplexing (WDM) network and dense wavelength-divisional multiplexing (DWDM) techniques may be employed to improve the spectral efficiency of an optical network. WDM and DWDM techniques involve transmitting data in optical signals at different wavelengths over a common or shared optical fiber, sometimes referred to as an optical link or an optical fiber cable. One example of this optical link is a Network Convergence System (NCS) 1004-based DWDM Submarine Optical Link that stretches on an ocean floor.

When an optical link is installed, it needs to be configured. To configure the optical link, the operator attempts to maximize Spectral Efficiency (SE). The SE is a line rate or a bit rate over a channel spacing. The operator performs a manual tuning of the cards, i.e. by searching step-by-step for an optimum combination of line rates, bits per symbol (bps), and channel spacing. The manual configuration of the optical link is a complex process that is time-consuming.

DESCRIPTION OF EXAMPLE EMBODIMENTS

Overview

Figure 1:
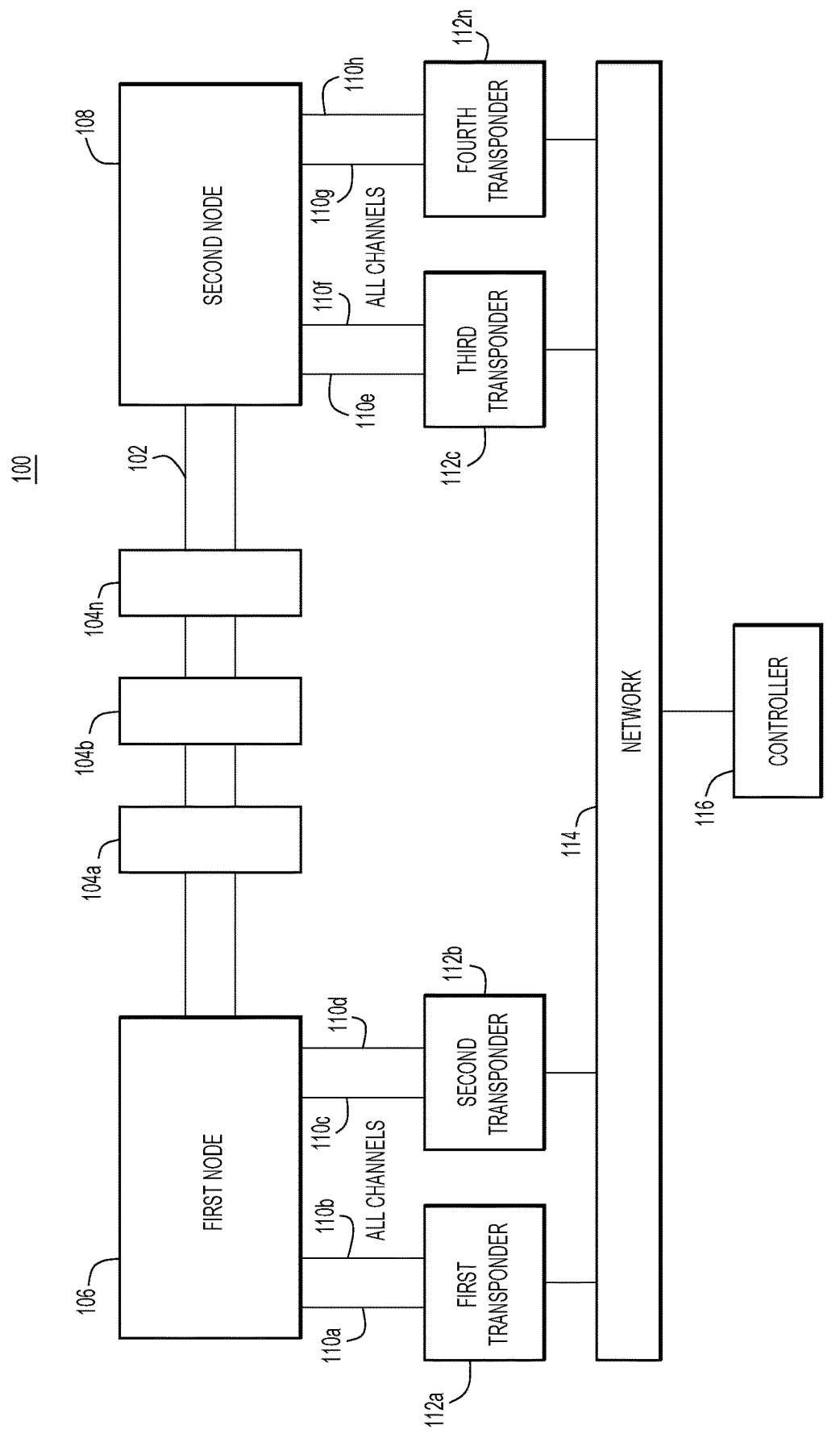
FIG. 1 is a block diagram illustrating an environment in which automatic bit rate and spectral efficiency optimization of an optical link may be implemented, according to an example embodiment.

Briefly, methods for configuring an optical link with an optimized spectral efficiency using a SNR-margin as input, are provided. A bisection searching algorithm for optimizing spectral efficiency is enabled to run according to a given value of SNR-margin. In these methods, a controller of an optical network obtains the SNR-margin and a baseline configuration that includes a traffic mode that uses a predetermined channel spacing of a plurality of channels in a frequency spectrum. The plurality of channels is used for transmitting optical signals on an optical link in the optical network. The controller converts the SNR-margin to a Q-margin threshold value associated with a Q-margin as a performance parameter of the optical link and while maintaining the performance parameter equal to or above the Q-margin threshold value, varies at least one transmission parameter to reduce channel spacing of the plurality of channels. The controller generates a spectral frequency map in which the channel spacing is reduced with respect to the baseline configuration and configures, via an optical network element in the optical network, the optical link based on the spectral frequency map.

Example Embodiments

To facilitate the configuration of an optical link, conventional techniques involve a characterization of optical line cards that is exploited in test settings such as laboratories. Typically, system specifications and advanced theoretical analysis are used to predict performance of the optical link. These predictions are then used as guess points to optimize the spectral efficiency of the optical link.

An alternative approach considers optical link impairments and is based on an application of an Inverse Back-to-Back ($B2B^{-1}$) method to derive, from values of a Q-Factor measured in real-time in the field, corresponding values of a generalized signal to noise ratio (GSNR) at system inputs, and use them as guess points to find the proper combination of bits per symbol (bps)/line rate/channel spacing to maximize the SE. This approach requires performing full characterization of the line cards in the B2B method, for all traffic modes to be considered. With the advent of the hybrid modes technology, the grid of traffic modes to be considered for each line rate is wide. Moreover, the inverse B2B method assumes that the statistics of the overall noise coming from the link is Gaussian. This assumption is not always true.

In one or more example embodiments, an optical link is configured with an optimized SE using techniques implemented in real-time and in the field as opposed to a laboratory setting. Initialization starts from any traffic mode and without any guess points. The techniques are based on a Q-margin as an example performance metric, and does not require any previous analysis of the optical link. Further, the techniques may exploit the SNR-margin as an input metric, which is then converted to the Q-Margin target value. Maximum SE is obtained by running the techniques at the installation of the optical link. According to one example embodiment, the techniques automatically consider impairments of the optical link and makes no assumptions on the statistics of the impairments of the optical link.

Specifically, the techniques involve a 3-channel probing approach with or without amplified spontaneous emission (ASE) loading, with a probe carrier line card, two adjacent aggressors and a real WDM comb. The techniques progressively check the Q-margin of the optical link for each line rate, starting from the most reliable traffic mode, and applies on the current line rate a bisection algorithm on a full range of bps line rates using the SNR-margin as input, to converge towards a Q-Margin target obtained from the SNR-margin, according to a predefined accuracy. As such, the techniques automatically and in real-time, maximize the SE of the optical link with the SNR-margin as the input metric and the Q-margin as the performance parameter.

While the Q-margin is measured in real-time and is a reliable performance indicator, characteristics of a submarine optical link are often expressed in terms of other performance indicators such as the SNR. The SNR may refer to an optical normalized SNR in a given bandwidth such as 12.5 GHz. To derive, during the system installation in the field, the Maximum Spectral Efficiency of the optical link, the above-presented algorithm can achieve same results if it is run by exploiting the SNR-margin as the input metric, as opposed to the Q-Margin as the input metric, by converting the input metric into the Q-Margin.

The presented algorithm does not exploit the SNR/GSNR calculated with the inverse B2B method to predict the performances of the optical link and derive the best traffic mode. Instead, it leverages on a formula (derived from the inverse B2B method itself) that provides for the conversion of the SNR-margin as an input parameter into the Q-Margin, and then uses just this last metric to derive the best traffic mode. The presented algorithm minimizes errors due to the conversion process, because the formula introduced into the algorithm allows to work with the SNR-margin/Q-Margin only, not requiring the absolute value of the SNR/GSNR at its input, that is usually difficult to evaluate with a satisfactory accuracy, and can make a searching algorithm not to converge.

The SNR-margin/Q-Margin conversion process is applied to derive the target and the tolerance values of SNR-margin and Q-Margin during the algorithm running, and it is not exploited to drive the algorithm convergence process, that is still based on the Q-Margin checking in real time. In this way, the convergence of the algorithm does not depend on a metric derived by a conversion process, but on a metric that is measured in real time, in such a way that the reliability and the accuracy of the result are maximized. The algorithm works in a blind fashion, without any guess point to run.

FIG. 1 is a block diagram illustrating an optical network 100 in which automatic SE optimization of an optical link may be implemented, according to an example embodiment.

The optical network 100 may employ WDM or DWDM technologies. The optical network 100 includes optical links or lines (collectively or individually referred to as an optical link 102), optical amplifiers 104a, 104b, . . . 104n along a path between a first node 106 and a second node 108. The optical network 100 further includes optical network elements, such as a first transponder 112a, a second transponder 112b, a third transponder 112c, and a fourth transponder 112n. A controller 116 is provided that is in communication with the transponders 112a-112n via a network 114.

The transponders 112a-112n are coupled via optical fibers to the respective first node 106 and second node 108. For example, the first transponder 112a is coupled via a first optical fiber 110a and a second optical fiber 110b to the first node 106. The first optical fiber 110a carries an optical signal to the first node 106 from the first transponder 112a, and the second optical fiber 110b carries an optical signal from the first node 106 to the first transponder 112a. The optical signal carried in the fibers 110a and 110b spans various DWDM channels. Similarly, the second transponder 112b is coupled via optical fibers 110c and 110d to the first node 106, the third transponder 112c is coupled via optical fibers 110e and 110f to the second node 108, and the fourth transponder 112n is coupled via the optical fibers 110g and 110h also to the second node 108. The first node 106 handles the DWDM channels that need to be optimized via the respective optical fibers 110a, 110b, 110c and 110d and similarly the second node 108 handles the DWDM channels via the respective optical fibers 110e, 110f, 110g and 110h.

The notation a, b, c, . . . n illustrates that the number of elements can vary depending on a particular implementation and is not limited to the number of elements depicted in the optical network 100.

In FIG. 1, the optical link 102 is connected between two terminal points or nodes (a first node 106 and a second node 108) without any filtering elements therein included. The optical link 102 may include the optical amplifiers 104a-104n provided to assist in propagating the optical signals along the length of the optical link 102. An example of the optical link 102 is one or more subterranean optical fibers or cables that transmit optical signals between the first node 106 and the second node 108 i.e., for bidirectional communication.

An example of the first node 106 and the second node 108 is an optical add/drop multiplexer (OADM) or a reconfigurable optical add/drop multiplexer (ROADM). The OADM or ROADM serves as an aggregation node when it transmits the optical signal via the optical link 102 and serves as a disaggregation node when it receives the optical signal from the optical link 102.

An aggregation node, i.e., first node 106 and second node 108, aggregates or combines optical signals received from some of the data sources i.e. the transponders 112a-112n. A disaggregation node separates the optical signals received from the optical link 102 and provides the separated optical signals to some of the data sources via some of the optical fibers 110a, 110b, 110c, 110d, 110e, 110f, and 110g. For example, the first transponder 112a transmits data to the first node 106 via a first optical fiber 110a and receives data from the first node 106 via a second optical fiber 110b. Analogously, the other data sources (transponders) transmit and receive data to a respective node via respective optical fibers, as shown in FIG. 1.

The first transponder 112a, second transponder 112b, third transponder 112c, and fourth transponder 112n may include components configured to provide bidirectional communication. For example, each of these optical network elements may include an optical transmitter and an optical receiver. The optical transmitter includes a transmit module and a transmitter digital signal processor (DSP) and an optical receiver include a receiver module and a receiver DSP. The transmit module and the receive module may be optical pluggable modules configured to transmit and receive optical signals, respectively. The DSPs process the optical signals and perform various signal processing operations, such as changing transmission parameters. These optical network elements may further include a processor and a memory. The processor controls the components of its optical network element, may change transmission parameters, and evaluate quality of signal (QoS) based on the information from the DSPs. The processor within each of the transponders 112a-112n changes the transmission parameters based on instructions from the controller 116.

The controller 116 controls the overall configuration of the optical network and communicates with the optical network elements via the network 114. The controller 116 symmetrically configures the optical network elements to optimize configuration parameters of the optical link 102 based on the techniques presented herein.

Figure 2:
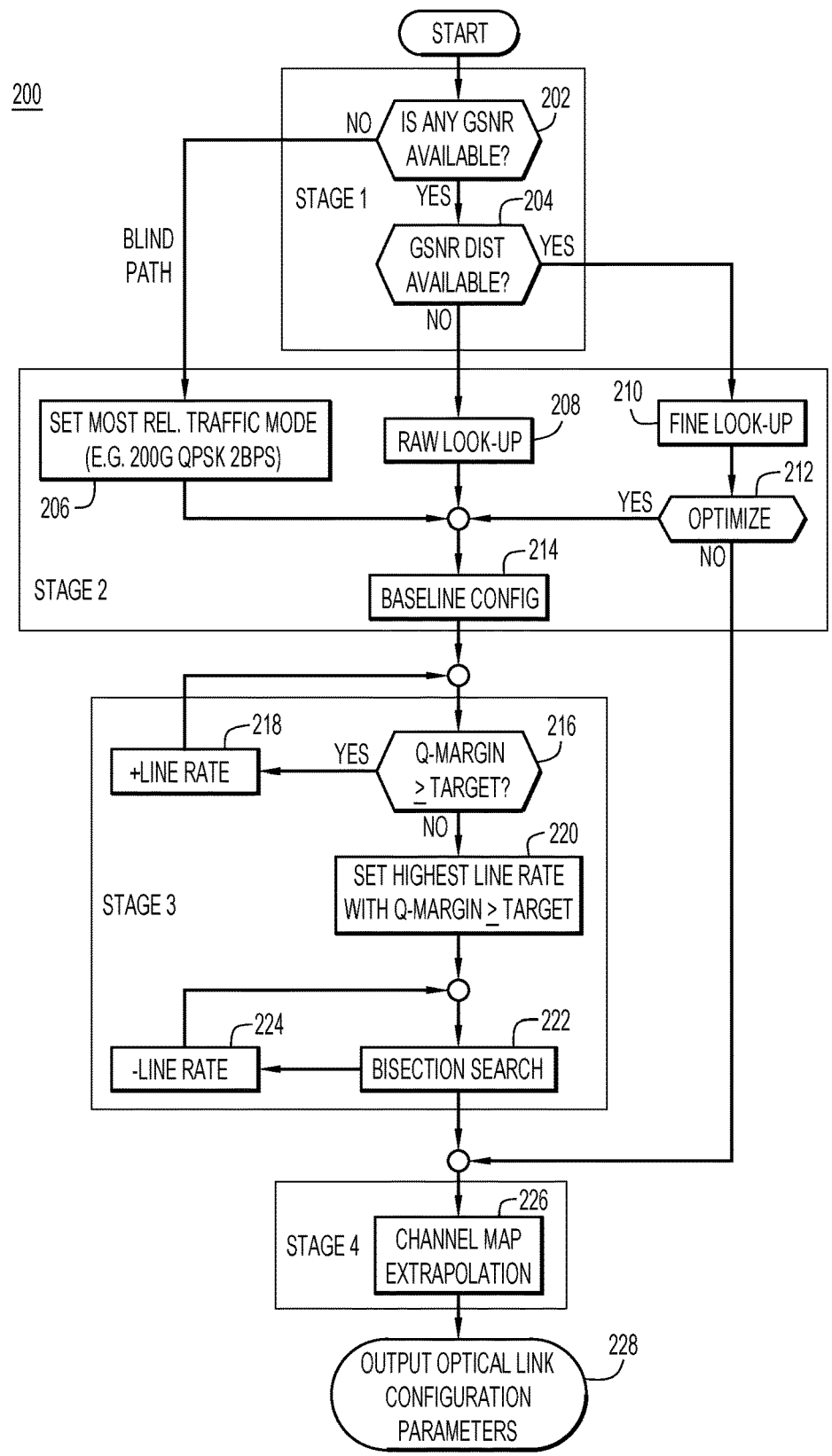
FIG. 2 is a flowchart illustrating a method of optimizing spectral efficiency of an optical link, according to an example embodiment.

Reference is now made to FIG. 2. FIG. 2 illustrates a flowchart of a method 200 for optimizing spectral efficiency of an optical link, such as the optical link 102 shown in FIG. 1, according to an example embodiment. The method 200 is performed by the controller 116. Reference is also made to FIG. 1 for purposes of the description of the method 200.

The method 200 includes four main stages:

Stage 1 involves obtaining input configuration parameters for optimizing SE of the optical link (if any);

Stage 2 involves setting base configuration parameters for generating a spectral frequency map;

Stage 3 involves executing three-channels probing for a traffic mode with maximum SE that satisfies the condition of Q-margin≥Target; and Stage 4 involves shrinking the channels for the spectral frequency map based on an interpolation and extrapolation of the channels.

These stages are illustrated to facilitate and simplify the description of the method 200.

Stage 1 includes operations 202 and 204 of the method 200 in which input configuration parameters of the optical link 102 are determined and obtained.

Specifically, at 202, the controller 116 determines if any characteristics related to GSNR of the optical link 102 are available. For example, the characteristics may include a single worst GSNR value of the optical link 102 that is known or a trend of GSNR values across available bandwidth or frequency spectrum (referred herein interchangeably) of the optical link 102.

Based on not having any such GSNR related characteristics available (No at 202), the method 200 proceeds to a blind path processing, described below. On the other hand, based on having some input i.e., at least one value regarding the GSNR of the optical link 102 (Yes at 202), a guess point look up may be performed. At 204, the controller 116 further determines whether a trend (or distribution) of the GSNR values versus frequency is available or whether only a single worst GSNR value of the optical link 102 is provided.

Stage 2 includes operations 206-214 in which the base configuration is set. As explained above, when there are no GSNR characteristics available, blind path processing is performed. Blind path processing means that there are no guess points to start the optimization procedure. That is, at 206, default parameters are set for configuring the optical link 102. The controller 116 automatically selects the most reliable traffic mode compatible with an overall available bandwidth, expected capacity of the optical link 102, number of trunks, and other requirements for the optical link 102. For example, the controller 116 sets the traffic mode to 200 Gbps with a given modulation scheme, such as Quadrature Phase Shift Keying (QPSK) 2, as default parameters of the optical link 102. In an example embodiment, on request, any baseline configuration can be selected. The baseline configuration may include data uploaded from a baseline configuration file.

Specifically, when the controller 116 determines that only a single worst GSNR value of the optical link 102 is provided (No at 204), at 208, the controller 116 performs a raw look-up. The raw look-up involves starting from the worst GSNR value, searching a first GSNR look-up table for a suitable traffic mode and selecting the most suitable traffic mode that is compatible with the worst GSNR value.

On the other hand, when the controller 116 determines that the trend of the GSNR values versus frequency (GSNR distribution over a frequency band) is available (Yes at 204), then at 210, the controller 116 performs a fine look-up. The fine look-up involves starting from the trend of GSNR values versus frequency of the optical link 102, searching a second GSNR look-up table and, corresponding to each carrier frequency in the DWDM comb, selecting the more suitable traffic mode compatible with the GSNR trend. The second GSNR look-up table is a more complex look-up table that provides detailed characteristics of the optical link 102 such that further optimizations may not necessarily be required.

Accordingly, at 212, the controller 116 determines whether optimization of the system performance with the Q-margin measurement in real-time is still warranted. If the optimization is warranted (Yes at 212), the baseline configuration parameters are set at 214. On the other hand, if the optimization is not warranted (No at 212), the trend of GSNR values versus frequency is not exploited to optimize system performances with a Q-margin measurement in real-time and the method 200 proceeds directly to an operation 226 of Stage 4, bypassing operations 216-222 of Stage 3 (these operations are explained in detail below).

At 214, the baseline configuration is obtained. In the baseline configuration, all channels are configured according to the selected traffic mode with a corresponding channel spacing.

Figure 3:
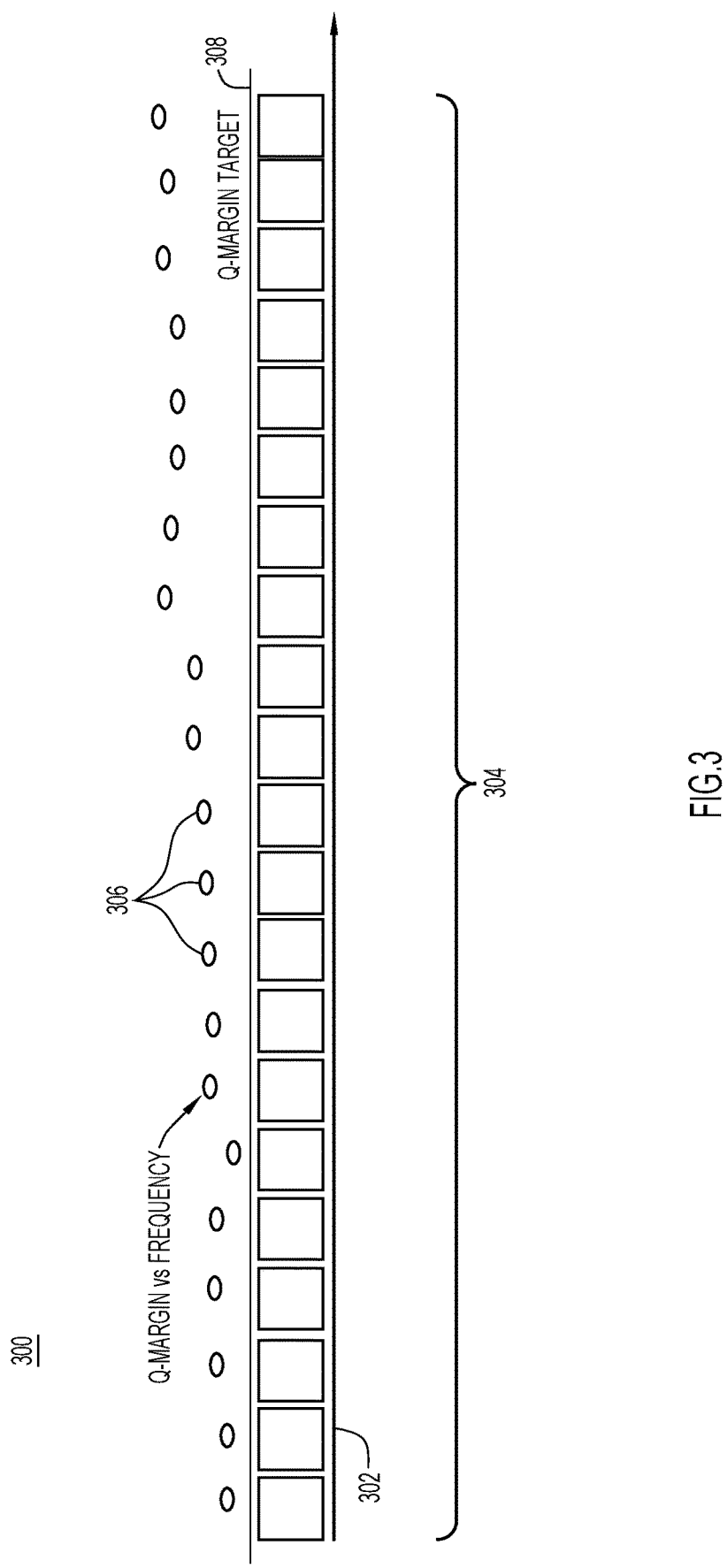
FIG. 3 is a view illustrating a baseline configuration for optimizing spectral efficiency of the optical link, according to an example embodiment.

FIG. 3 illustrates a baseline configuration 300 for optimizing spectral efficiency of the optical link, according to an example embodiment. The baseline configuration 300 is the output of the Stage 2 and is a starting point for the probing procedure of Stage 3.

The baseline configuration 300 includes a frequency spectrum 302 (available bandwidth) having a plurality of wavelength channels 304, typically depicted as equally spaced squares along the frequency spectrum 302. The shaded dots indicate Q-Margin for each frequency channel, shown at 306. The Q-margin of the channels 306 are above the Q-Margin target 308. The baseline configuration 300 is an example of a blind approach in which all of the channels 306 are configured according to a most reliable traffic mode (substantially above the Q-Margin target 308).

Referring back to FIG. 2, Stage 3 includes operations 216-224 in which the base configuration is optimized by a probing procedure. The controller 116 may select a full frequency spectrum or a subset of channels along the frequency spectrum (start and stop frequency) for the optimization.

At 216, at each selected channel, based on a measured parameter (e.g. bit error rate (BER)), the Q-margin is determined and compared to a target (e.g., Q-Margin target 308). The target may be one of the input parameters provided by an operator or set as a default by the controller 116 e.g., 1 or 2 dB. Based on determining that the Q-margin is greater or equal to the target, a traffic mode with a higher line rate is chosen at 218, and the Q-margin is derived again and compared to the target at 216. This iterative loop continues until at 216, the controller 116 determines that the Q-margin of the respective frequency is less than the target. At 220, the previous traffic mode which satisfied the condition of having the Q-margin greater or equal to the target is selected for the bisection search to be performed at operation 222. The previous traffic mode has the highest line rate and satisfies the condition of Q-margin≥target.

As noted above, the operations 216-220 can be bypassed if a preferred traffic mode has been selected and set, and the bisection search can be directly performed at operation 222 to optimize it. If the complete flow of operations 216-224 is performed, a full-feature optimization is warranted. If the operations 216-220 are bypassed, only a partial optimization is warranted, according to the preferred traffic mode selection.

At 222, a bisection search is performed. The bisection search at 222 is an optional operation and is provided to assure the convergence of the algorithm with the highest reliability. According to various example embodiments, different implementations that omit the bisection search may be provided e.g. guess points, interpolations-based algorithms, and so on. In the bisection search, the controller iteratively searches for the maximum SE that fulfills the condition: "Q-margin≥Target" at 216. The search iteratively varies the bps and the impairment produced on the selected channel according to the line rate selection, along the available bandwidth or the frequency spectrum. In an example embodiment, the bisection search at 222 includes a three-channels probing technique described below, where the variation of the impairment on the channel is produced by moving the channel spacing. Any other option to change the impairment on the channel together with the bps is considered within the scope of an example embodiment e.g., by enhancing the number of aggressors to the selected channels or by varying the frequency location and the combination of a baud rate (BR) and guard band (GB) of the aggressors.

To further maximize SE of the optical link 102, at 224, the line rate may be decreased and the bisection search performed on the decreased line rate, at 222. This is an optional operation to account for the maximum SE being not necessarily at the highest line rate. Accordingly, the line rate may be decreased to maximize SE of the optical link.

Figure 4:
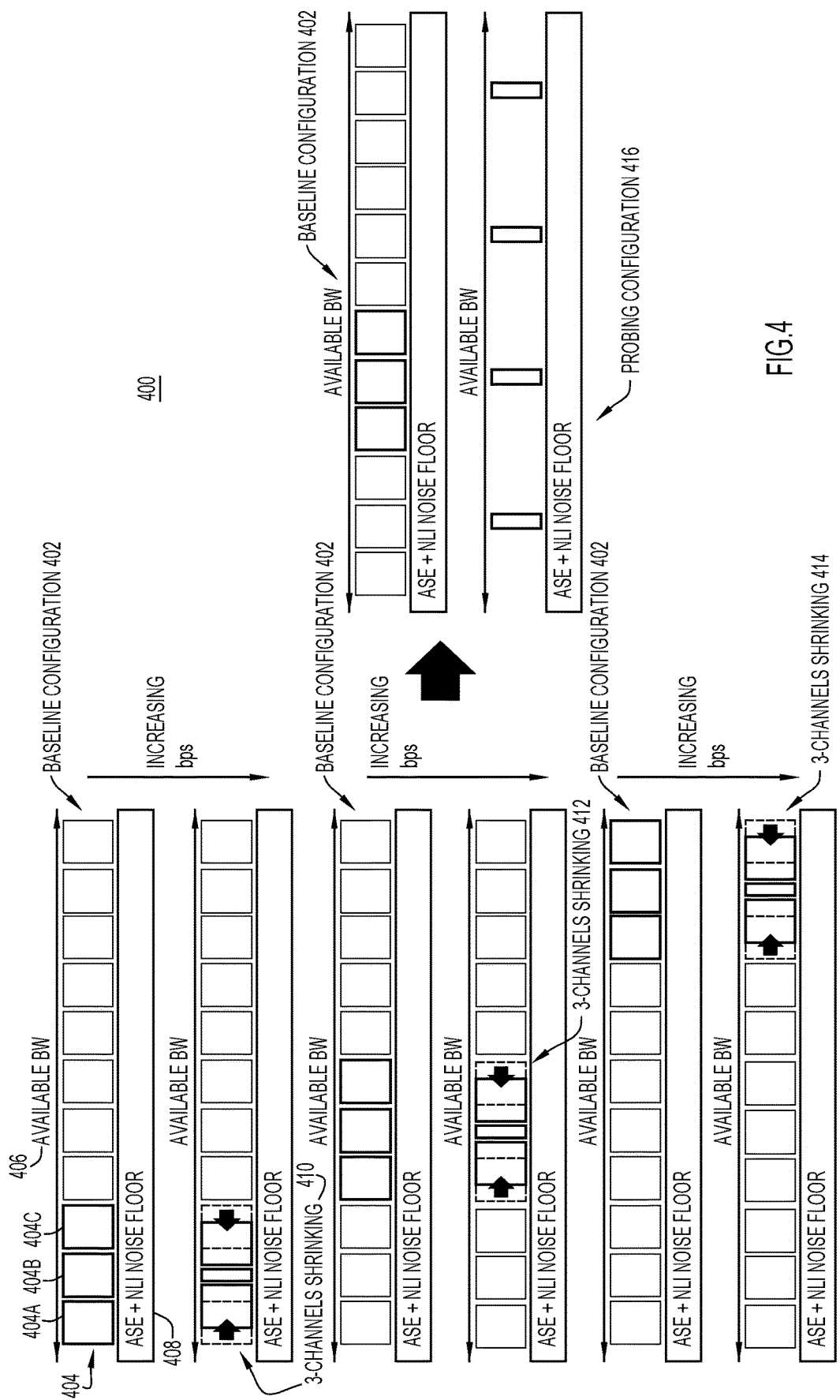
FIG. 4 is a diagram illustrating a probing method for optimizing spectral efficiency of the optical link, according to an example embodiment.

FIG. 4 is a diagram illustrating a probing method 400 for optimizing SE of the optical link, according to an example embodiment. The probing method 400 may start with a baseline configuration 402, in which the channels 404 are depicted as equally spaced squares along the frequency spectrum (available bandwidth 406).

The probing method 400 iteratively searches across the available bandwidth 406 using three channels at a time. A channel 404b is a probe carrier and channels 404a and 404c are adjacent channels (aggressors) i.e., two carrier frequencies symmetrically placed around the probe carrier. The channels 404A, 404B, and 404C may be with or without amplified spontaneous emission (ASE) loading and with or without cross-channel nonlinear interference (NSI) noise level floor (ASE and NLI noise floor 408).

The probing method iteratively searches for the maximum SE along the assigned bandwidth or frequency spectrum that fulfills the condition: "Q-margin≥Target" and is for the selected traffic mode (line rate), with a predefined granularity. At each channel frequency value e.g., the channel 404b, the optimal channel spacing is obtained by iteratively changing the bps line rate and shrinking the channel spacing of the two adjacent channels 404a and 404c, as shown at 410. At 412, the same process is performed yet again with the next three channels from among the channels 404 and at 414, the same process is performed with the last three channels from among the channels 404.

In short, the bps and line rate are increased and the channel spacing of the aggressors are shrunk closer to the center channel until the programmed Q-margin is available. Once the limit is reached, the probes are configured back to their baseline configuration and the same process is continued for the next three channels along the available bandwidth. Once the probing procedure is completed, a map of bps/BR/line rate versus channel frequency is obtained, with a resolution given by the selected three-channels granularity. This map is shown in FIG. 4 as a probing configuration 416.

The three-channels granularity of method 400 is by way of an example only. The mapping granularity may be one of the input parameters obtained from the user or a default value set by the controller 116 and may vary according to a particular implementation. More granularity will provide a better optimization of the SE of the optical link 102.

Referring back to FIG. 2, Stage 4 includes operation 226. At 226, the controller 116 further interpolates and extrapolates the probing configuration 416 (channel map) (shown in FIG. 4) by shrinking the channel spacing.

Figure 5:
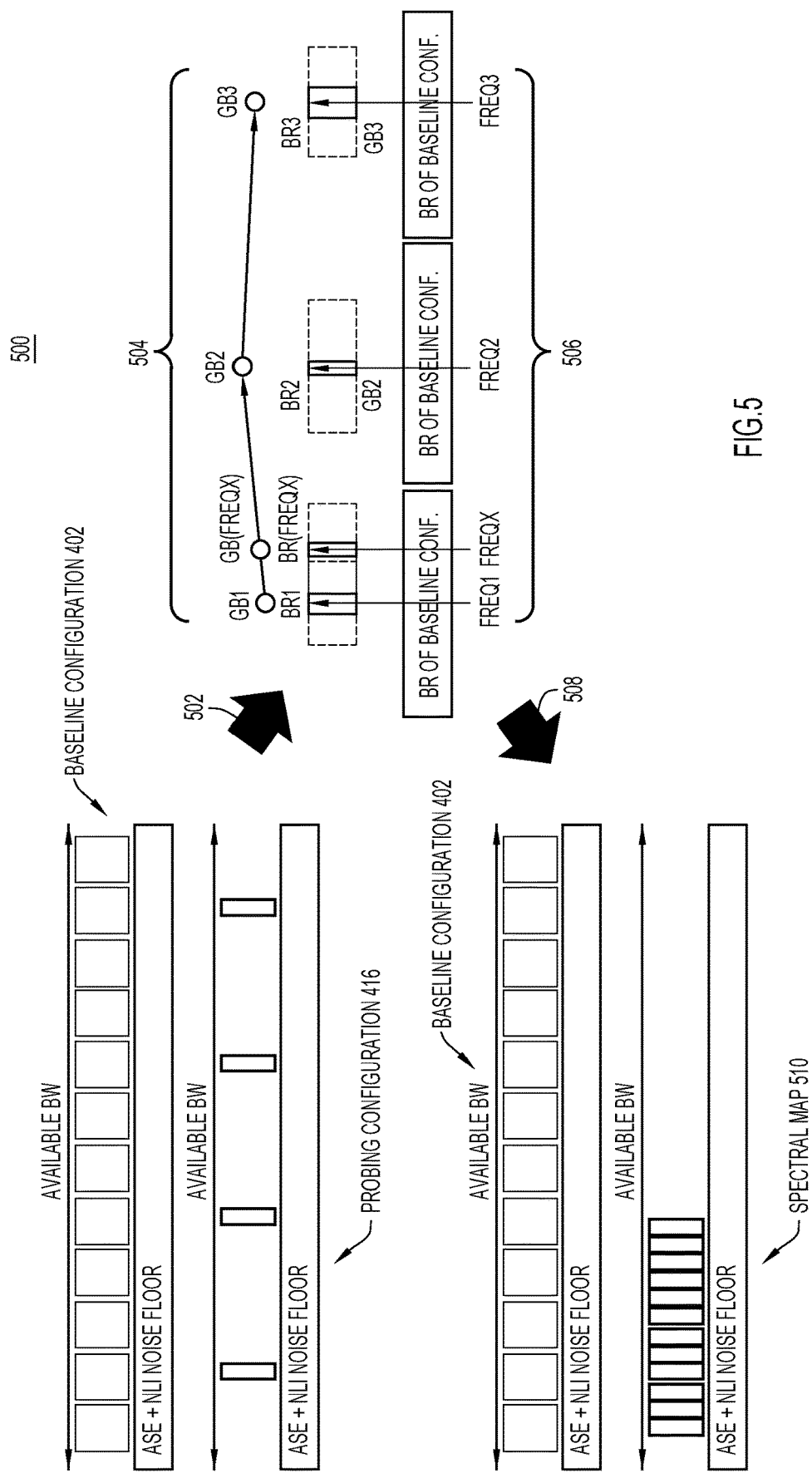
FIG. 5 is a diagram illustrating a method of generating a spectral map using a channel map extrapolation procedure for optimizing spectral efficiency of the optical link, according to an example embodiment.

Reference is now made to FIG. 5. FIG. 5 illustrates is a diagram depicting a method 500 of generating a spectral map using a channel map extrapolation procedure for maximizing SE of the optical link 102, according to an example embodiment.

In FIG. 5, the probing configuration 416 obtained from the baseline configuration 402 is depicted on the left side. Next, while maintaining the line rate fixed, BR/GB is extrapolated along the frequency bandwidth as follows.

At 502, frequency mappings are performed. As such, at 504, baseline configuration of each center channel (a BR of baseline configuration 506) has a corresponding value of BR and GB obtained from the probing procedure of the Stage 3. For example, values GB1/BR 1 at frequency 1, GB2/BR2 at frequency 2, and GB3/BR3 at frequency 3. These values are interpolated to perform proper fitting. In various example embodiments, various interpolation techniques may be performed such as a linear interpolation, a step-function, a polynomial, etc. Based on interpolating across these values, an interpolated value GB and BR at frequency X is obtained. At 508, the channels are shrunk based on the results of the interpolation procedure and the spectral map 510 is obtained. The channels are interpolated to progressively shrink channel spacing by minimizing bandwidth allocated to the channels and maximizing the SE. As a result of the interpolation, the values of the proper bps/BR/line rate can be extrapolated in correspondence of each frequency, and a higher resolution across the available bandwidth with respect to the baseline configuration 402 is obtained. A shrunk channel comb carrying different bps/BR/line rate combinations is then arranged. This is just one example embodiment to obtain an optimum configuration. Other example embodiments may exploit the spectral map procedure to obtain an acceptable configuration that may not be fully optimized.

Referring back to FIG. 2, at 228, the controller 116 outputs a set of configuration parameters to the optical network elements (transponders 112a-112n of FIG. 1). The set of the configuration parameters are based on the spectral map 510 shown in FIG. 5. The optical network elements configure the optical link 102 based on the received set of configuration parameters. The configuration parameters include the selected traffic mode (line rate), the optimized SE, and/or the optimized bit rate.

According to various example embodiments, the techniques presented herein derive, in real-time and in the field, optimal BR/bps with the maximum SE at a highest or at a given line rate for a given system configuration. Using a subset of contiguous channels (a mapping granularity is defined), adjacent channels are moved closer and closer to the center channel frequency according to a predefined GB vs BR vs Line Rate trend. Further at least one transmission parameter may be varied. The adjacent channels are moved closer to the center channel to produce a desired crosstalk impairment, by correspondingly varying the line rate and bps/BR. The center channel frequency is shifted by an amount equal to the mapping granularity and the operations are repeated until all available channels are covered. The maximum line rate/bps/BR/GB with Q-Margin≥Target in correspondence of each probe carrier is assigned and a best fitting of line rate/bps/BR/GB vs. frequency is performed to derive a trend of line rate/bps/BR/GB vs. frequency. As a result, a spectral map with line rate/bps/BR/GB/Q-Margin vs. Frequency is generated.

In various example embodiments, these techniques converge to a traffic mode with maximum SE and maximum line rate. According to various example embodiments, different transmission, measurement, and performance parameters may be used. For example, SNR, GSNR, OSNR, pre-Forward Error Correction Bit Error Rate (pre FEC BER), Q-Factor, mutual information (MI) performance metrics, and/or general MI (GMI) performance metrics are used. Further, a traffic mode may be defined by various transmission parameters such as baud rate, bps rate, line rate, and/or channel spacing.

According to one example, embodiment, when different performance parameters are provided, as an input metric, a conversion procedure may then be employed to convert the input metric into a target for the performance metric that can be measured in real-time such as the Q-margin, so as not to degrade the reliability and accuracy of the algorithm explained above.

The inverse-B2B method is often suggested to derive the capacity of a submarine cable, and then exploit it to find the proper combination of bps/LineRate/channel spacing to maximize the spectral efficiency with the SNR or GSNR metrics. This target may be obtained by applying the procedure presented above that exploits the Q-Margin. In one form, the inverse B2B method is exploited to enable the bisection algorithm to manage the SNR-margin metric with same accuracy and reliability obtained with the Q-Margin metric. This technique still operates in real-time, in the field according to a blind approach, and it does not need any guess point to run.

This technique does not exploit the SNR/GSNR calculated with the inverse B2B method to predict the performance of the system and derive the best traffic mode. Rather, this technique leverages on a formula derived from the inverse B2B method itself, that allows the use of the SNR-margin as an input parameter, which is converted to Q-Margin, which in turn is used to derive the best traffic mode. This preserves the same procedure presented above that leads to a reliable and accurate result.

Figure 6:
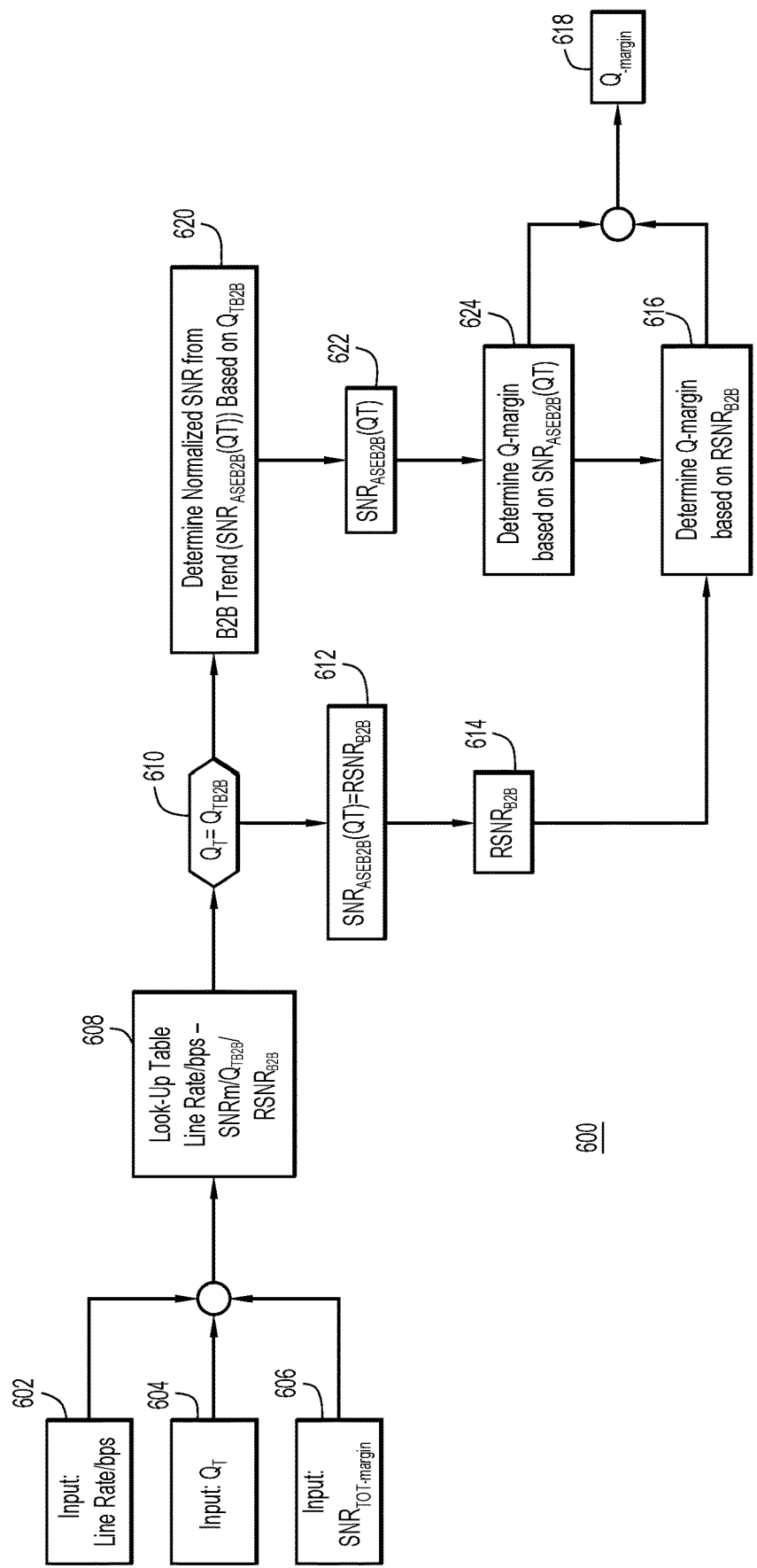
FIG. 6 is a flow chart of a process for converting a signal-to-noise (SNR) margin metric to a Q-margin metric, according to an example embodiment.

FIG. 6 illustrates a flow chart of a conversion method 600 for converting an SNR-margin to a Q-Margin, according to an example embodiment. The method 600 is performed by the controller 116 shown in FIG. 1.

The method 600 includes, at 602-606, obtaining input configuration parameters of an optical link, such as the optical link 102 shown in FIG. 1. Specifically, at 602, the line rate and bps are obtained. The line rate/bps is a starting point that is being considered and may correspond to the most reliable traffic mode (substantially above the SNR-margin). At 604, a Q-factor or a Q threshold ($Q_T$), obtained using FEC at an output of the optical link 102, is obtained.

The $Q_T$ is derived by measuring B2B of the optical link 102 or from a measured characterization of the optical link 102.

At 606, the SNR-margin is obtained. The SNR-margin is a normalized-overall SNR-margin ($SNR_{TOT\text{-}Margin}$) that addresses all or most noise terms except for intrinsic normalized SNR of a modem or a receiver e.g., the first node 106 or the second node 108. The $SNR_{TOT\text{-}Margin}$ is approximately independent from impairments of the optical link 102. The $SNR_{TOT\text{-}Margin}$ is an input provided by a customer or is obtained using an iterative process of the bisection search algorithm described with reference to FIG. 8.

At 608, a table lookup operation is performed based on the input line rate/bps. The lookup operation obtains SNR values and a Q-Factor, which correspond to the input line rate/bps in a reference table stored and/or accessed by the controller 116. The SNR values include a required normalized SNR of the optical link 102 based on B2B measurements ($RSNR_{B2B}$) and an intrinsic normalized SNR of the modem or the receiver (SNRm) that is an intrinsic value of the receiver e.g., the first node 106 or the second node 108. The SNRm is obtained from a previous characterization of the receiver derived from B2B measurements. The Q-Factor is obtained using FEC from B2B ($Q_{TB2B}$) and is retrieved from a table for the input line rate/bps.

At 610, the input $Q_T$ is compared to the retrieved $Q_{TB2B}$ to determine if the two are equal. The decision flag/operation $Q_T=Q_{TB2B}$ is used to simplify the conversion procedure from a mathematical point of view. In principle, with some calculation, it is possible to reduce the conversion formulas in a single (albeit more complex analytical) expression, thereby allowing for removing the decision flag/operation, with the same result.

In some cases, the input $Q_T$ is the same as the retrieved $Q_{TB2B}$ because the contribution of the optical link 102 is mainly due to generalized noise and linear impairments are mainly compensated by DSP, so the two values are typically the same. When $Q_T=Q_{TB2B}$, at 612, the normalized SNR from the B2B trend ($SNR_{ASEB2B}$) for the $Q_T$ is set to the retrieved $RSNR_{B2B}$ and, at 614, the $RSNR_{B2B}$ is input into a conversion algorithm.

At 616, the Q-Margin is determined based on the input $RSNR_{B2B}$ using the following equation:

$$Q-\text{margin} = \frac{1 + \frac{RSNRB2B}{SNRm}}{\frac{1}{SNRTOT-\text{margin}} + \frac{RSNRB2B}{SNRm}},$$

in which:
$RSNR_{B2B}$ is the Required Normalized SNR from B2B,
SNRm is the Intrinsic Normalized-SNR of the receiver, and $SNR_{TOT\text{-}margin}$ is the normalized overall SNR-Margin that excludes the SNRm.

Figure 8:
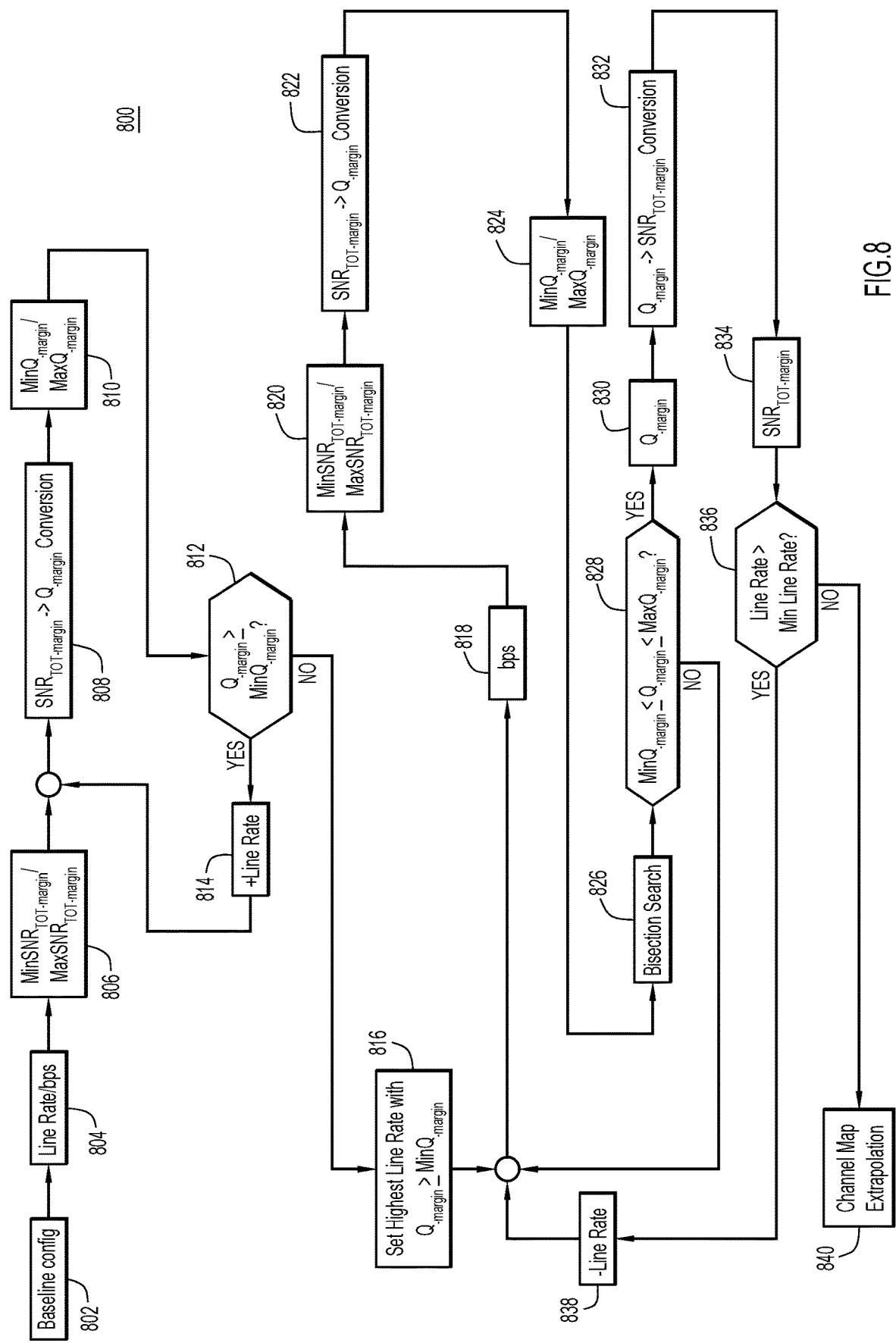
FIG. 8 is a flow chart of a process, similar to FIG. 2, but adapted to use an SNR-margin as input, according to an example embodiment.

At 618, the derived Q-margin is output and applied in a bisection searching algorithm 800 of FIG. 8.

When the decision at 610 results in $Q_T$ not being equal to $Q_{TB2B}$, using the $RSNR_{B2B}$ as the $SNR_{ASEB2B}$ can lead to a lack of accuracy, in the conversion process. Instead, the $SNR_{ASEB2B}$ is derived using both the $Q_T$ and $Q_{TB2B}$. Specifically, at 620, the $SNR_{ASEB2B}$ for the $Q_T$ is calculated using the following equation:

$$SNRASEB2B(QT) = \frac{1}{\frac{Q_{TB2B}}{QT}\left(\frac{1}{RSNRB2B}\right) - \frac{1}{SNRm}\left(1 - \frac{Q_{TB2B}}{QT}\right)},$$

in which:
  $Q_{TB2B}$ is a Q-factor obtained using FEC from B2B,
  $Q_T$ is the Q-factor at FEC threshold,
  $RSNR_{B2B}$ and SNRm are defined above.

At 622, the derived $SNR_{ASEB2B}$ is input into the conversion algorithm instead of $RSNR_{B2B}$.

At 624, the Q-margin is computed based on the input $SNR_{ASEB2B}$ using the following equation:

$$Q-\text{margin} = \cfrac{1 + \cfrac{SNRASEB2B(QT)}{SNRm}}{\cfrac{1}{SNRTOT-\text{margin}} + \cfrac{SNRASEB2B(QT)}{SNRm}}.$$

These variables are defined above.

At 618, the Q-Margin derived at 624 is output and applied in the bisection search algorithm of FIG. 8.

Figure 7:
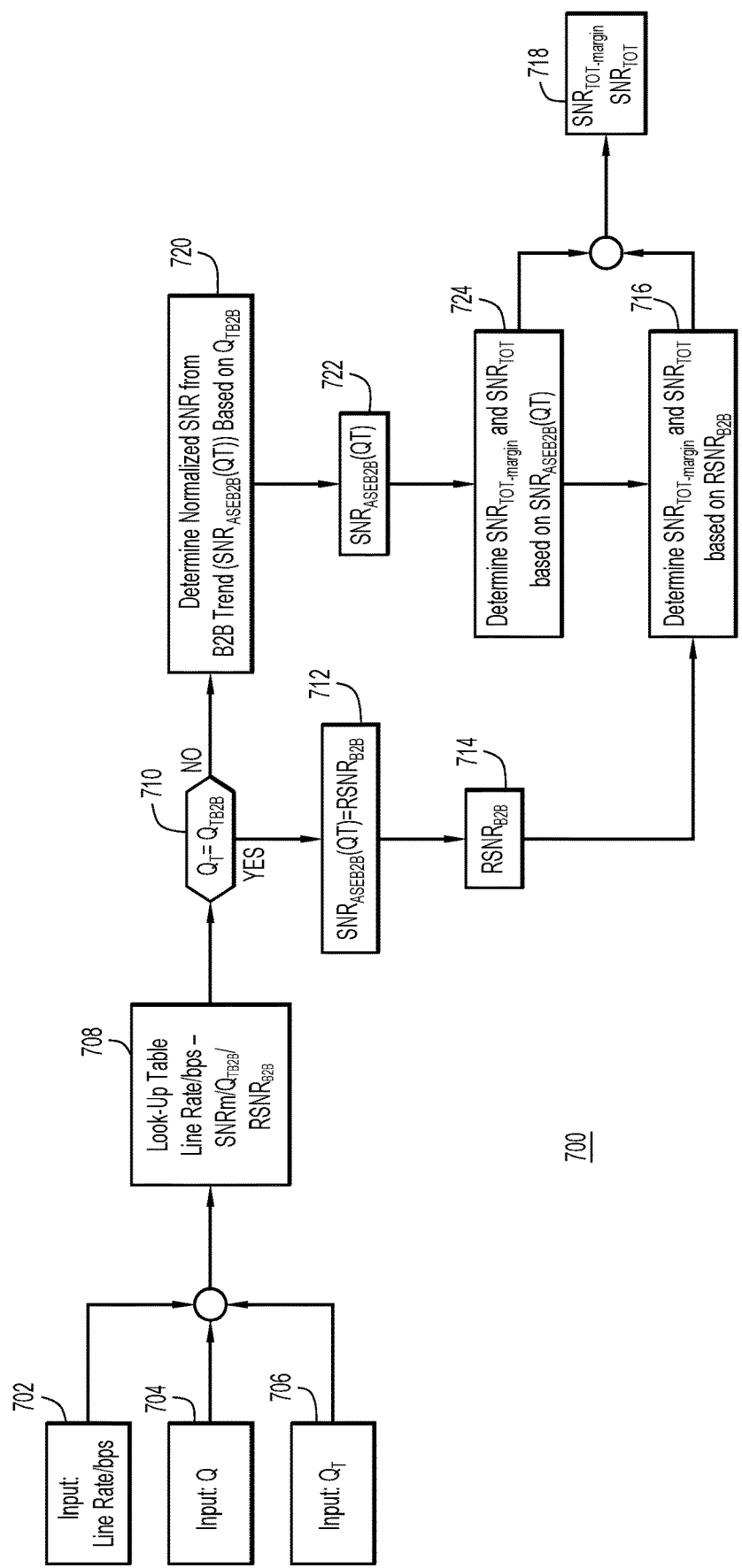
FIG. 7 is a flow chart of a process for converting a Q-margin metric to an SNR-margin metric, according to an example embodiment.

FIG. 7 illustrates a flow chart of a reverse conversion method 700 for converting the Q-margin back to the SNR-margin, according to an example embodiment. The method 700 is performed by the controller 116 shown in FIG. 1. The method 700 is a reverse procedure with respect to the method 600. The reverse conversion is used because the performance parameters may be expressed in the form of SNR values.

The method 700 includes, at 702-706, obtaining input configuration parameters of an optical link such as the optical link 102 shown in FIG. 1. Specifically, at 702, the line rate and bps are input. At 704, Q-Margin (Q) is input. The Q is the measured performance parameter that is converted into the SNR-margin. The Q is obtained using an iterative process of the bisection search algorithm of FIG. 8. At 706, the Q-factor ($Q_T$), explained above, is input.

At 708, a table lookup operation is performed, based on the input line rate/bps, in which SNR values ($RSNR_{B2B}$ and SNRm) and the Q-Factor ($Q_{TB2B}$) are retrieved, similar to 608 in FIG. 6. At 710, the input $Q_T$ is compared to the retrieved $Q_{TB2B}$ to determine if the two are equal, similar to 610 in FIG. 6. When $Q_T=Q_{TB2B}$, at 712, the normalized SNR from the B2B trend ($SNR_{ASEB2B}$) for the $Q_T$ is set to the $RSNR_{B2B}$, similar to 612 in FIG. 6. At 714, the $RSNR_{B2B}$ is input into a reverse conversion algorithm.

At 716, the $SNR_{TOT-margin}$ and the $SNR_{TOT}$ are computed. The $SNR_{TOT}$ is the normalized overall SNR that addresses all or most of the noise terms except for the SNRm.

The $SNR_{TOT-margin}$ is computed using the following equation:

$$SNR_{TOT-margin} = \cfrac{1}{\cfrac{Q_T}{Q} - \cfrac{RSNRB2B}{SNRm}\left(1 - \cfrac{Q_T}{Q}\right)}$$

in which:
  Q is the input Q-margin and the remaining variables are defined above.

The $SNR_{TOT}$ is computed using the following equation:

$$SNR_{TOT} = \cfrac{1}{\cfrac{Q_T}{Q}\left(\cfrac{1}{RSNRB2B}\right) - \cfrac{1}{SNRm}\left(1 - \cfrac{Q_T}{Q}\right)}.$$

These variables are defined above.

The $SNR_{TOT-margin}$ and the $SNR_{TOT}$ are both output from the conversion procedure but, at 718, only the $SNR_{TOT-margin}$ is applied in the Stage 3 of the bisection search algorithm of FIG. 8. This is due to the higher accuracy that is obtained by exploiting the $SNR_{TOT-margin}$ as a metric, as opposed to the absolute value of the SNR, given by the $SNR_{TOT}$. In practice, the $SNR_{TOT}$ should be considered only as a further capability of the algorithm, that provides an estimation of the performances of the system.

On the other hand, when $Q_T$ is not equal $Q_{TB2B}$ at 710, the $SNR_{ASEB2B}(Q_T)$ needs to be computed. Specifically, at 720, the $SNR_{ASEB2B}$ ($Q_T$) is determined using the same equation as in 620 in FIG. 6 and at 722, the computed $SNR_{ASEB2B}$ ($Q_T$) is input to determine the $SNR_{TOT}$-margin and the $SNR_{TOT}$.

At 724, the $SNR_{TOT-margin}$ is determined using the following equation:

$$SNR_{TOT-margin} = \cfrac{1}{\cfrac{Q_T}{Q} - \cfrac{SNRASEB2B(QT)}{SNRm}\left(1 - \cfrac{Q_T}{Q}\right)}.$$

These variables are defined above.

The $SNR_{TOT}$ is determined using the following equation:

$$SNR_{TOT} = \cfrac{1}{\cfrac{Q_T}{Q}\left(\cfrac{1}{SNRASEB2B(QT)}\right) - \cfrac{1}{SNRm}\left(1 - \cfrac{Q_T}{Q}\right)}.$$

These variables are defined above.

Thereafter, the derived $SNR_{TOT-margin}$ and the $SNR_{TOT}$ are output at 718.

FIG. 8 illustrates a flow chart for a bisection searching algorithm 800, similar to that shown in FIG. 2, but modified to accommodate the use of SNR total margin as an input parameter, according to an example embodiment. In other words, Stage 3 in which the base configuration is optimized by a probing procedure is based on the SNR total margin as opposed to the Q-Margin. Accordingly, the bisection searching algorithm 800 includes the conversion procedures described in FIGS. 6 and 7. The bisection searching algorithm 800 is performed by the controller 116 shown in FIG. 1.

At 802, similar to 214 in FIG. 2, the baseline configuration is obtained.

At 804, the selected traffic mode (line rate/bps) is obtained, similar to 602 in FIGS. 6 and 702 in FIG. 7.

At 806, the SNR-margin is obtained. The SNR-margin includes a minimum SNR-margin ($MinSNR_{TOT-margin}$) and a maximum SNR-margin ($MaxSNR_{TOT-margin}$).

At 808, the $SNR_{TOT}$-Margin (the $MinSNR_{TOT-margin}$ and the $MaxSNR_{TOT-margin}$) are converted to the Q-Margin, using the conversion method 600 of FIG. 6.

At 810, the minimum Q-Margin ($MinQ_{margin}$) and the maximum Q-Margin ($MaxQ_{margin}$) are obtained.

At 812, similar to 216 in FIG. 2, at each selected channel, based on a measured parameter, the Q-margin is determined and compared to a target, the $MinQ_{margin}$. Based on determining that the measured Q-margin is above or equal to the $MinQ_{margin}$, the line rate is increased, at 814, similar to 218 in FIG. 2. The process then returns to operation 808 in which the $MinSNR_{TOT-margin}$ and the $MaxSNR_{TOT-margin}$ of the next line rate i.e., the traffic mode with the higher line rate, is converted to $MinQ_{margin}$ and $MaxQ_{margin}$, respectively.

The iterative loop continues until at 812, the controller 116 determines that the measured Q-margin of the respective frequency is less than the $\text{MinQ}_{margin}$. At 816, similar to 220 in FIG. 2, the highest line rate (the previous traffic mode) that satisfied the condition at 812 is selected for the bisection search.

At 818, a bps for the selected line rate is obtained.

At 820, the $\text{SNR}_{TOT}$-Margin (the $\text{MinSNR}_{TOT\text{-}margin}$ and the $\text{MaxSNR}_{TOT\text{-}margin}$) for the selected line rate and bps are obtained and at 822, $\text{SNR}_{TOT\text{-}Margin}$ is converted to the Q-Margin, using the conversion method 600 in FIG. 6. At 824, the minimum Q-Margin ($\text{MinQ}_{margin}$) and the maximum Q-Margin ($\text{MaxQ}_{margin}$) are output for the selected line rate and bps.

At 826, the bisection search is performed using the three-channels probing technique in FIG. 4. The bisection search is similar to the operation 222 in FIG. 2.

At 828, the measured Q-margin is compared to the $\text{MinQ}_{margin}$ and the $\text{MaxQ}_{margin}$.

If the Q-margin is less than or equal to the $\text{MinQ}_{margin}$ or is greater than or equal to the $\text{MaxQ}_{margin}$, a different bps is selected at 818, and the operations 820-828 are repeated based on the different bps. The iterative loop continues until at 828, the Q-margin is greater than the $\text{MinQ}_{margin}$ and is also less than the $\text{MaxQ}_{margin}$, and at this point, the Q-margin is output at 830.

At 832, the Q-margin is converted to the $\text{SNR}_{TOT\text{-}Margin}$, using the reverse conversion method 700 in FIG. 7, and the $\text{SNR}_{TOT\text{-}Margin}$ is output at 834.

At 836, the current line rate is compared to the minimum line rate e.g., minimum allowed line rate.

If the current line rate is greater than the minimum line rate, then, at 838, the line rate may be decreased to further maximize SE of the optical link 102. The bisection searching algorithm 800 then returns to the operation 818 at which the bps for the decreased line rate is selected and the operations 820-838 are repeated based on the decision points 828 and 836. The iterative loop of decreasing the line rate at 838, varying the bps at 818, converting the SNR values at 822, performing the bisection search at 826, comparing the measured Q-margin at 828, reverse converting the Q-margin to the SNR value at 832, continues until, at 836, the line rate is determined to be equal to the minimum line rate. At this point, the SE of the optical link 102 is determined to be maximized and at 840, channel map extrapolation is performed, similar to the operation 226 in FIG. 2.

Figure 9:
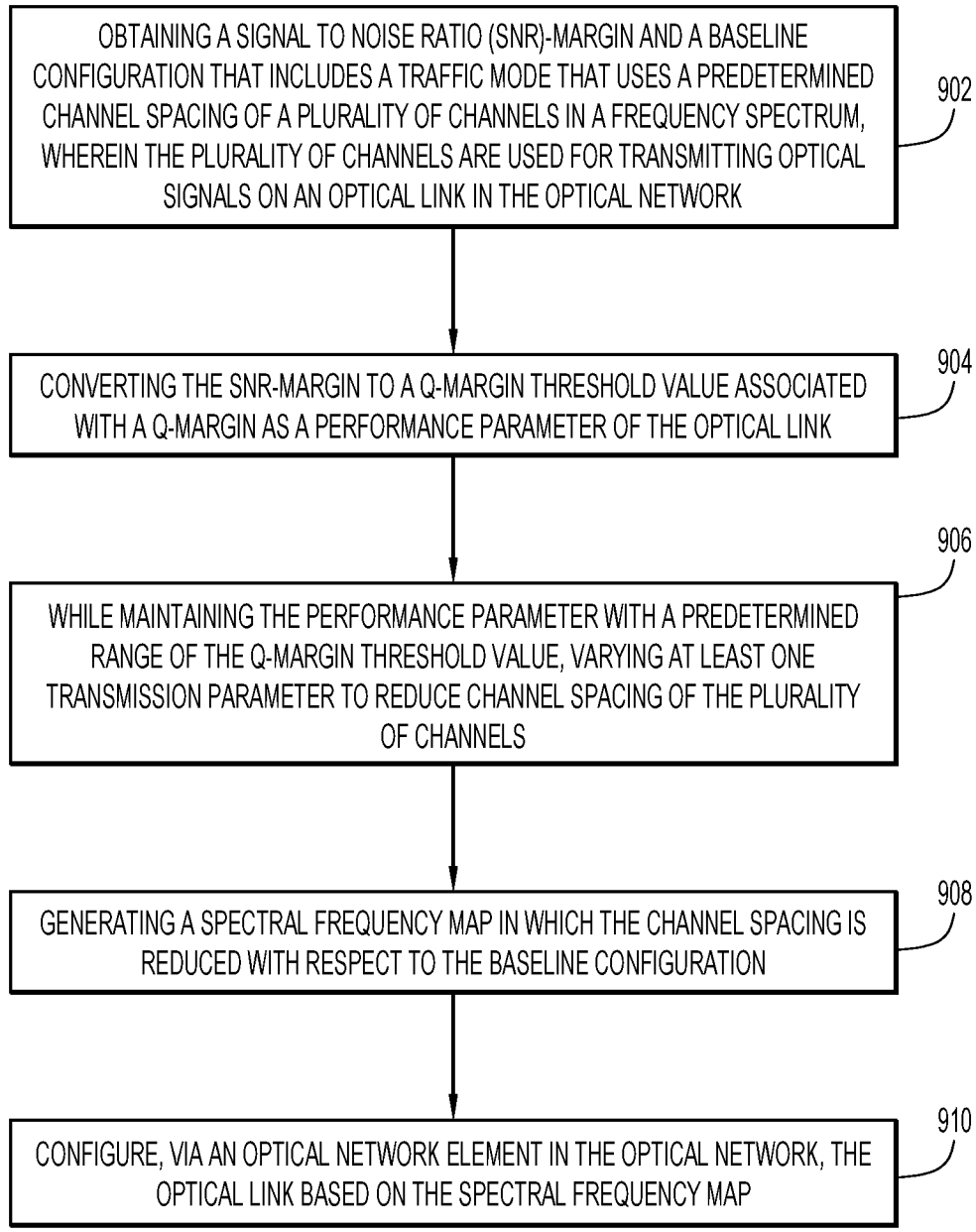
FIG. 9 is a flowchart illustrating a method of configuring an optical link, according to an example embodiment.

FIG. 9 is a flowchart of a method 900 for configuring an optical link, according to an example embodiment. The method 900 is performed by a controller of an optical network e.g., the controller 116 shown in FIG. 1.

At 902, the controller obtains a signal to noise ratio (SNR)-margin and a baseline configuration that includes a traffic mode that uses a predetermined channel spacing of a plurality of channels in a frequency spectrum, wherein the plurality of channels are used for transmitting optical signals on an optical link in the optical network.

At 904, the controller converts the SNR-margin to a Q-margin threshold value associated with a Q-margin as a performance parameter of the optical link.

At 906, while maintaining the performance parameter with a predetermined range of the Q-margin threshold value, varying at least one transmission parameter to reduce channel spacing of the plurality of channels.

At 908, the controller generates a spectral frequency map in which the channel spacing is reduced with respect to the baseline configuration.

At 910, the controller configures, via an optical network element in the optical network, the optical link based on the spectral frequency map.

According to one or more example embodiments, the Q-margin threshold value includes a minimum Q-margin threshold and a maximum Q-margin threshold and the varying operation 906 may include changing a value of the at least one transmission parameter that includes a bits per symbol rate or a baud rate in response to the performance parameter being below or equal to the maximum Q-margin threshold and above or equal to the minimum Q-margin threshold, obtaining the SNR-margin that includes a minimum SNR-margin and a maximum SNR-margin and that is associated with the value of the at least one transmission parameter, converting the minimum SNR-margin and the maximum SNR-margin to the minimum Q-margin threshold and the maximum Q-margin threshold, respectively, and measuring the performance parameter related to the plurality of channels.

In at least one instance, changing the value of the at least one transmission parameter, obtaining the SNR-margin, converting the minimum SNR-margin and the maximum SNR-margin, and measuring the performance parameter, are iteratively performed, by the controller, while the performance parameter is within a range set by the maximum Q-margin threshold and the minimum Q-margin threshold.

In one form, the method 900 may further include the controller converting the performance parameter to an SNR-margin value in response to the performance parameter being outside a range set by the maximum Q-margin threshold and the minimum Q-margin threshold.

According to one or more example embodiments, the controller converts the performance parameter to the SNR-margin value by performing a lookup operation, based on at least the traffic mode, to obtain an intrinsic normalized-SNR, a Q-factor at a forward error correction from a back-to-back method, and a required normalized-SNR from the back-to-back method and computing the SNR-margin value based on the performance parameter, the Q-factor, the required normalized-SNR from the back-to-back method, and the intrinsic normalized-SNR.

In at least one instance, the controller converts the performance parameter to the SNR-margin value by using the required normalized-SNR to compute the SNR-margin value in response to the Q-factor being equal to an input Q-factor at the forward error correction at an output of the optical link. In response to the Q-factor not being equal to the input Q-factor, the controller may compute the normalized-SNR from a back-to-back trend based on the required normalized-SNR, the Q-factor, the input Q-factor, and the intrinsic normalized-SNR and use the computed normalized-SNR to compute the SNR-margin value.

In one form, the converting operation 904 may include performing a lookup operation, based on the traffic mode, to obtain an intrinsic normalized-SNR, a Q-factor at a forward error correction from a back-to-back method, and a required normalized-SNR from the back-to-back method and computing the Q-margin threshold value based on the SNR-margin, the required normalized-SNR, the intrinsic normalized-SNR, and the Q-factor.

According to one or more example embodiments, computing the Q-margin threshold value may include, in response to the Q-factor being equal to an input Q-factor at the forward error correction at an output of the optical link, the controller uses the required normalized-SNR to compute the Q-margin threshold value. In response to the Q-factor not being equal to the input Q-factor, the controller computes a normalized-SNR from a back-to-back trend based on the required normalized-SNR, the Q-factor, the input Q-factor, and the intrinsic normalized-SNR, and then uses the normalized-SNR to compute the Q-margin threshold value.

According to one or more example embodiments, the Q-margin threshold value includes a minimum Q-margin threshold and a maximum Q-margin threshold and the varying operation 906 may include selecting, by the controller, three contiguous channels that include a center channel and two adjacent channels; reducing channel spacing of the center channel with respect to the baseline configuration; measuring the performance parameter, and in response to the performance parameter being greater or equal to the minimum Q-margin and less than or equal to the maximum Q-margin, changing a value of the at least one transmission parameter that includes at least one of a bit per symbol rate or a baud rate.

In one form, the method 900 includes, in response to changing the value of the at least one transmission parameter, the controller obtains the SNR-margin associated with the value of the at least one transmission parameter and converts the SNR-margin to the Q-margin threshold value. The controller repeats reducing the channel spacing, measuring the performance parameter, and changing the value of the at least one transmission parameter while the performance parameter remains within a range set by the Q-margin threshold value.

According to one or more example embodiments, the method 900 may further include the controller determining an optimal traffic mode in which a line rate is optimized while keeping the performance parameter equal to or above the Q-margin threshold value and applying the optimal traffic mode to the baseline configuration.

Figure 10:
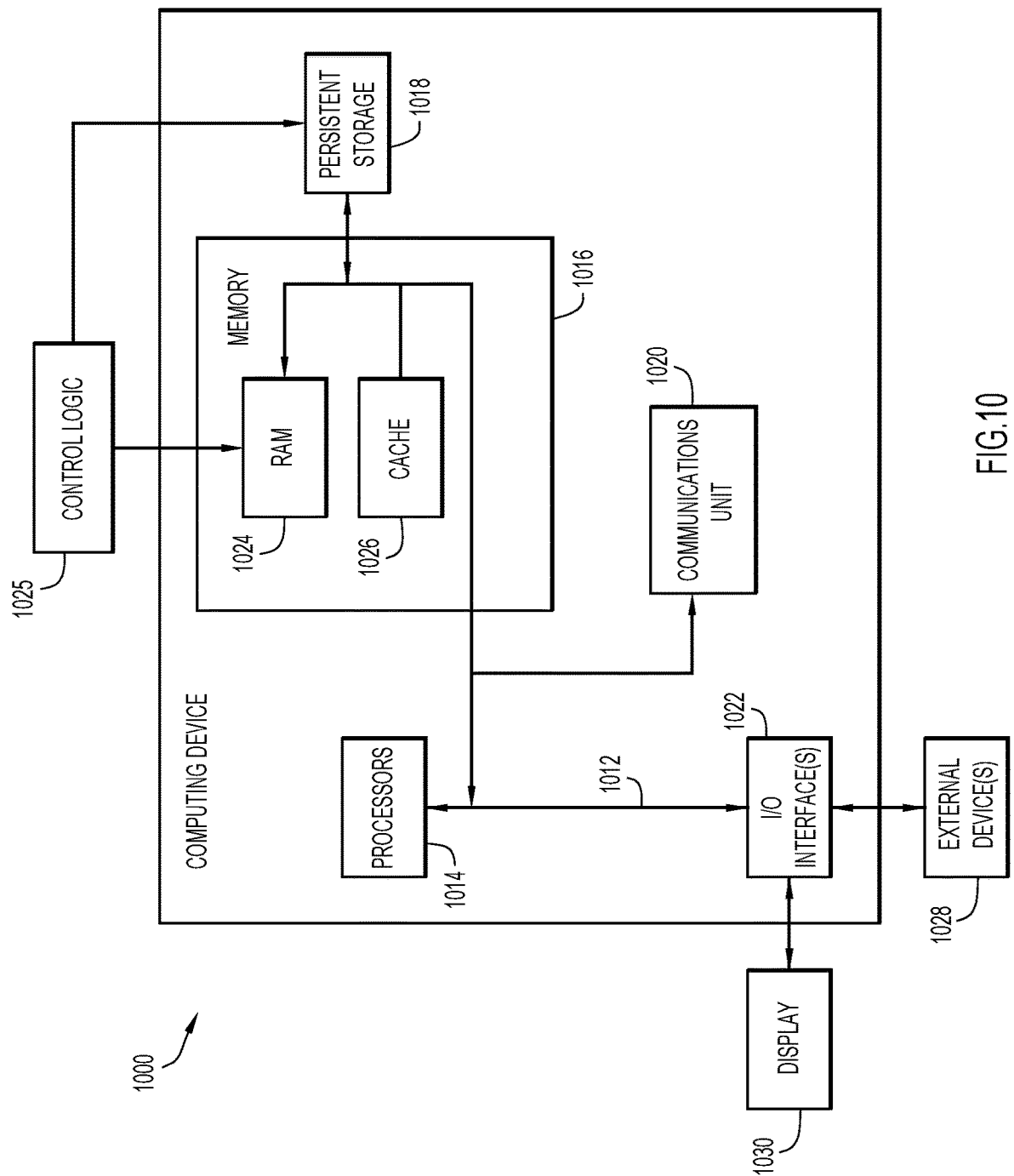
FIG. 10 is a hardware block diagram of a computing device configured to perform the techniques of optimizing spectral efficiency, according to various example embodiments.

FIG. 10 is a hardware block diagram illustrating a computing device 1000 that may perform the functions of a computing or control entity referred to herein in connection with FIGS. 1-9, according to an example embodiment. The computing device 1000 performs the functions of the controller 116 of FIG. 1. The computing device 1000 may take the form of a virtual machine cluster or third-party cloud computing environment.

It should be appreciated that FIG. 10 provides only an illustration of one embodiment and does not imply any limitations with regard to the environments in which different embodiments may be implemented. Many modifications to the depicted environment may be made.

As depicted, the computing device 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media. In the depicted embodiment, memory 1016 includes random access memory (RAM) 1024 and cache memory 1026. In general, memory 1016 can include any suitable volatile or non-volatile computer readable storage media. Instructions for the control logic 1025 may be stored in memory 1016 or persistent storage 1018 for execution by processor(s) 1014.

The control logic 1025 includes instructions that, when executed by the computer processor(s) 1014, cause the computing device 1000 to perform one or more of the methods described herein including a method of configuring an optical link based on a generated spectral map. The control logic 1025 may be stored in the memory 1016 or the persistent storage 1018 for execution by the computer processor(s) 1014.

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links.

I/O interface(s) 1022 allows for input and output of data with other devices that may be connected to computing device 1000. For example, I/O interface 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via I/O interface(s) 1022. I/O interface(s) 1022 may also connect to a display 1030. Display 1030 provides a mechanism to display data to a user and may be, for example, a computer monitor.

In still another example embodiment, an apparatus is a controller of an optical network. The apparatus includes a communication interface configured to enable network communications, a memory configured to store executable instructions, and a processor coupled to the communication interface and the memory. The processor is configured to perform operations that include obtaining a signal to noise ratio (SNR)-margin and a baseline configuration that includes a traffic mode that uses a predetermined channel spacing of a plurality of channels in a frequency spectrum. The plurality of channels is used for transmitting optical signals on an optical link in an optical network. The processor is further configured to convert the SNR-margin to a Q-margin threshold value associated with a Q-margin as a performance parameter of the optical link. The processor is further configured, while maintaining the performance parameter with a predetermined range of the Q-margin threshold value, vary at least one transmission parameter to reduce channel spacing of the plurality of channels, generate a spectral frequency map in which the channel spacing is reduced with respect to the baseline configuration, and configure, via an optical network element in the optical network, the optical link based on the spectral frequency map.

According to one or more example embodiments, the Q-margin threshold value includes a minimum Q-margin threshold and a maximum Q-margin threshold and the processor may further be configured to vary the at least one transmission parameter by, in response to the performance parameter being below or equal to the maximum Q-margin threshold value and above or equal to the minimum Q-margin threshold, changing a value of the at least one transmission parameter that includes a bits per symbol rate or a baud rate, obtaining the SNR-margin that includes a minimum SNR-margin and a maximum SNR-margin and that is associated with the value of the at least one transmission parameter, converting the minimum SNR-margin and the maximum SNR-margin to the minimum Q-margin threshold and the maximum Q-margin threshold, respectively, and measuring the performance parameter related to the plurality of channels.

In at least one instance, the processor may be configured to iteratively change the value of the at least one transmission parameter, obtain the SNR-margin, convert the minimum SNR-margin and the maximum SNR-margin, and measure the performance parameter, while the performance parameter is within a range set by the maximum Q-margin threshold value and the minimum Q-margin threshold.

According to one or more example embodiments, the processor may further be configured to convert the performance parameter to an SNR-margin value in response to the performance parameter being outside a range set by the maximum Q-margin threshold value and the minimum Q-margin threshold.

In at least one instance, the processor is configured to convert the SNR-margin to the Q-margin threshold value by performing a lookup operation, based on the traffic mode, to obtain an intrinsic normalized-SNR, a Q-factor at a forward error correction from a back-to-back method, and a required normalized-SNR from the back-to-back method, and by computing the Q-margin threshold value based on the SNR-margin, the required normalized-SNR, the intrinsic normalized-SNR, and the Q-factor.

In yet another example embodiment, one or more non-transitory computer readable storage media encoded with instructions are provided. When the media is executed by the processor, the instructions cause the processor to perform operations including obtaining a signal to noise ratio (SNR)-margin and a baseline configuration that includes a traffic mode that uses a predetermined channel spacing of a plurality of channels in a frequency spectrum, where the plurality of channels are used for transmitting optical signals on an optical link in an optical network and converting the SNR-margin to a Q-margin threshold value associated with a Q-margin as a performance parameter of the optical link. The operations further include, while maintaining the performance parameter equal to or above the Q-margin threshold value, varying at least one transmission parameter to reduce channel spacing of the plurality of channels, generating a spectral frequency map in which the channel spacing is reduced with respect to the baseline configuration, and configuring, via an optical network element in the optical network, the optical link based on the spectral frequency map.

According to one or more example embodiments, the Q-margin threshold value includes a minimum Q-margin threshold and a maximum Q-margin threshold and the instructions may cause the processor to vary the at least one transmission parameter by changing a value of the at least one transmission parameter that includes a bits per symbol rate or a baud rate in response to the performance parameter being below or equal to the maximum Q-margin threshold value and above or equal to the minimum Q-margin threshold, and by obtaining the SNR-margin that includes a minimum SNR-margin and a maximum SNR-margin and that is associated with the value of the at least one transmission parameter, by converting the minimum SNR-margin and the maximum SNR-margin to the minimum Q-margin threshold and the maximum Q-margin threshold, respectively, and by measuring the performance parameter related to the plurality of channels.

In one form, the instructions may further cause the processor to iteratively change the value of the at least one transmission parameter, obtain the SNR-margin, convert the minimum SNR-margin and the maximum SNR-margin, and measure the performance parameter while the performance parameter is within a range set by the maximum Q-margin threshold value and the minimum Q-margin threshold.

In at least one instance, the instructions cause the processor to convert the SNR-margin to the Q-margin threshold value by performing a lookup operation, based on the traffic mode, to obtain an intrinsic normalized-SNR, a Q-factor at a forward error correction from a back-to-back method, and a required normalized-SNR from the back-to-back method and by computing the Q-margin threshold value based on the SNR-margin, the required normalized-SNR, the intrinsic normalized-SNR, and the Q-factor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The above description is intended by way of example only. While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
   obtaining, by a controller of an optical network, a signal-to-noise ratio (SNR)-margin and a baseline configuration that includes a traffic mode that uses a predetermined channel spacing of a plurality of channels in a frequency spectrum, wherein the plurality of channels are used for transmitting optical signals on an optical link in the optical network;
   converting, by the controller, the SNR-margin to a Q-margin threshold value associated with a Q-margin as a performance parameter of the optical link by obtaining SNR values based on the traffic mode, the SNR values including an intrinsic normalized-SNR and a required normalized-SNR, and using the SNR values to compute the Q-margin;
   while maintaining the performance parameter with a predetermined range of the Q-margin threshold value, varying at least one transmission parameter to reduce channel spacing of the plurality of channels;
   generating, by the controller, a spectral frequency map in which the channel spacing is reduced with respect to the baseline configuration; and
   configuring, by the controller via an optical network element in the optical network, the optical link based on the spectral frequency map.

2. The method of claim 1, wherein the Q-margin threshold value includes a minimum Q-margin threshold and a maximum Q-margin threshold and varying the at least one transmission parameter includes:
   in response to the performance parameter being below or equal to the maximum Q-margin threshold and above or equal to the minimum Q-margin threshold, changing a value of the at least one transmission parameter that includes a bits per symbol rate or a baud rate;

obtaining the SNR-margin that includes a minimum SNR-margin and a maximum SNR-margin and that is associated with the value of the at least one transmission parameter;

converting the minimum SNR-margin and the maximum SNR-margin to the minimum Q-margin threshold and the maximum Q-margin threshold, respectively; and measuring the performance parameter related to the plurality of channels.

3. The method of claim 2, wherein changing the value of the at least one transmission parameter, obtaining the SNR-margin, converting the minimum SNR-margin and the maximum SNR-margin, and measuring the performance parameter are iteratively performed while the performance parameter is within a range set by the maximum Q-margin threshold and the minimum Q-margin threshold.

4. The method of claim 2, further comprising:
in response to the performance parameter being outside a range set by the maximum Q-margin threshold and the minimum Q-margin threshold, converting the performance parameter to an SNR-margin value.

5. The method of claim 4, wherein converting the performance parameter to the SNR-margin value includes:
performing a lookup operation, based on at least the traffic mode, to obtain the intrinsic normalized-SNR, a Q-factor at a forward error correction from a back-to-back method, and the required normalized-SNR from the back-to-back method; and computing the SNR-margin value based on the performance parameter, the Q-factor, the required normalized-SNR from the back-to-back method, and the intrinsic normalized-SNR.

6. The method of claim 5, wherein converting the performance parameter to the SNR-margin value further includes:
in response to the Q-factor being equal to an input Q-factor at the forward error correction at an output of the optical link, using the required normalized-SNR to compute the SNR-margin value; and in response to the Q-factor not being equal to the input Q-factor, computing a normalized-SNR from a back-to-back trend based on the required normalized-SNR, the Q-factor, the input Q-factor, and the intrinsic normalized-SNR, and using the normalized-SNR to compute the SNR-margin value.

7. The method of claim 1, wherein converting the SNR-margin to the Q-margin threshold value includes:
performing a lookup operation, based on the traffic mode, to obtain the intrinsic normalized-SNR, a Q-factor at a forward error correction from a back-to-back method, and the required normalized-SNR from the back-to-back method; and computing the Q-margin threshold value based on the SNR-margin, the required normalized-SNR, the intrinsic normalized-SNR, and the Q-factor.

8. The method of claim 7, wherein computing the Q-margin threshold value includes:
in response to the Q-factor being equal to an input Q-factor at the forward error correction at an output of the optical link, using the required normalized-SNR to compute the Q-margin threshold value, and in response to the Q-factor not being equal to the input Q-factor, computing a normalized-SNR from a back-to-back trend based on the required normalized-SNR, the Q-factor, the input Q-factor, and the intrinsic normalized-SNR, and using the normalized-SNR to compute the Q-margin threshold value.

9. The method of claim 1, wherein the Q-margin threshold value includes a minimum Q-margin threshold and a maximum Q-margin threshold and varying the at least one transmission parameter includes:
selecting, by the controller, three contiguous channels that include a center channel and two adjacent channels;
reducing channel spacing of the center channel with respect to the baseline configuration;
measuring the performance parameter; and
in response to the performance parameter being above or equal to the minimum Q-margin threshold and below or equal to the maximum Q-margin threshold, changing a value of the at least one transmission parameter that includes at least one of a bit per symbol rate or a baud rate.

10. The method of claim 9, further comprising:
in response to changing the value of the at least one transmission parameter, obtaining the SNR-margin associated with the value of the at least one transmission parameter and converting the SNR-margin to the Q-margin threshold value; and
repeating reducing the channel spacing, measuring the performance parameter, and changing the value of the at least one transmission parameter while the performance parameter is within a range set by the Q-margin threshold value.

11. The method of claim 1, further comprising:
determining an optimal traffic mode in which a line rate is optimized while keeping the performance parameter equal to or above the Q-margin threshold value; and
applying the optimal traffic mode to the baseline configuration.

12. An apparatus comprising:
a communication interface configured to enable network communications;
a memory configured to store executable instructions; and
a processor coupled to the communication interface and the memory and configured to perform operations including:
obtaining a signal-to-noise ratio (SNR)-margin and a baseline configuration that includes a traffic mode that uses a predetermined channel spacing of a plurality of channels in a frequency spectrum, wherein the plurality of channels are used for transmitting optical signals on an optical link in an optical network;
converting the SNR-margin to a Q-margin threshold value associated with a Q-margin as a performance parameter of the optical link by obtaining SNR values including an intrinsic normalized-SNR and a required normalized-SNR based on the traffic mode, and using the SNR values to compute the Q-margin;
while maintaining the performance parameter with a predetermined range of the Q-margin threshold value, varying at least one transmission parameter to reduce channel spacing of the plurality of channels;
generating a spectral frequency map in which the channel spacing is reduced with respect to the baseline configuration; and
configuring, via an optical network element in the optical network, the optical link based on the spectral frequency map.

13. The apparatus of claim 12, wherein the Q-margin threshold value includes a minimum Q-margin threshold and a maximum Q-margin threshold and the processor is configured to vary the at least one transmission parameter by:

in response to the performance parameter being below or equal to the maximum Q-margin threshold and above or equal to the minimum Q-margin threshold, changing a value of the at least one transmission parameter that includes a bits per symbol rate or a baud rate;

obtaining the SNR-margin that includes a minimum SNR-margin and a maximum SNR-margin and that is associated with the value of the at least one transmission parameter;

converting the minimum SNR-margin and the maximum SNR-margin to the minimum Q-margin threshold and the maximum Q-margin threshold, respectively; and measuring the performance parameter related to the plurality of channels.

14. The apparatus of claim 13, wherein the processor is configured to iteratively change the value of the at least one transmission parameter, obtain the SNR-margin, convert the minimum SNR-margin and the maximum SNR-margin, and measure the performance parameter, while the performance parameter is within a range set by the maximum Q-margin threshold and the minimum Q-margin threshold.

15. The apparatus of claim 13, wherein the processor is further configured to:

in response to the performance parameter being outside a range set by the maximum Q-margin threshold and the minimum Q-margin threshold, convert the performance parameter to an SNR-margin value.

16. The apparatus of claim 12, wherein the processor is configured to convert the SNR-margin to the Q-margin threshold value by:

performing a lookup operation, based on the traffic mode, to obtain an intrinsic normalized-SNR, a Q-factor at a forward error correction from a back-to-back method, and a required normalized-SNR from the back-to-back method; and computing the Q-margin threshold value based on the SNR-margin, the required normalized-SNR, the intrinsic normalized-SNR, and the Q-factor.

17. One or more non-transitory computer readable storage media encoded with instructions that, when executed by a processor, cause the processor to perform operations including:

obtaining a signal-to-noise ratio (SNR)-margin and a baseline configuration that includes a traffic mode that uses a predetermined channel spacing of a plurality of channels in a frequency spectrum, wherein the plurality of channels are used for transmitting optical signals on an optical link in an optical network;

converting the SNR-margin to a Q-margin threshold value associated with a Q-margin as a performance parameter of the optical link by obtaining SNR values including an intrinsic normalized-SNR and a required normalized-SNR based on the traffic mode, and using the SNR values to compute the Q-margin;

while maintaining the performance parameter with a predetermined range of the Q-margin threshold value, varying at least one transmission parameter to reduce channel spacing of the plurality of channels;

generating a spectral frequency map in which the channel spacing is reduced with respect to the baseline configuration; and configuring, via an optical network element in the optical network, the optical link based on the spectral frequency map.

18. The one or more non-transitory computer readable storage media according to claim 17, wherein the Q-margin threshold value includes a minimum Q-margin threshold and a maximum Q-margin threshold and the instructions cause the processor to vary the at least one transmission parameter by:

in response to the performance parameter being below or equal to the maximum Q-margin threshold and above or equal to the minimum Q-margin threshold, changing a value of the at least one transmission parameter that includes a bits per symbol rate or a baud rate;

obtaining the SNR-margin that includes a minimum SNR-margin and a maximum SNR-margin and that is associated with the value of the at least one transmission parameter;

converting the minimum SNR-margin and the maximum SNR-margin to the minimum Q-margin threshold and the maximum Q-margin threshold, respectively; and measuring the performance parameter related to the plurality of channels.

19. The one or more non-transitory computer readable storage media according to claim 18, wherein the instructions cause the processor to iteratively change the value of the at least one transmission parameter, obtain the SNR-margin, convert the minimum SNR-margin and the maximum SNR-margin, and measure the performance parameter while the performance parameter is within a range set by the maximum Q-margin threshold value and the minimum Q-margin threshold.

20. The one or more non-transitory computer readable storage media according to claim 17, wherein the instructions cause the processor to convert the SNR-margin to the Q-margin threshold value by:

performing a lookup operation, based on the traffic mode, to obtain the intrinsic normalized-SNR, a Q-factor at a forward error correction from a back-to-back method, and the required normalized-SNR from the back-to-back method; and computing the Q-margin threshold value based on the SNR-margin, the required normalized-SNR, the intrinsic normalized-SNR, and the Q-factor.

* * * * *